United States Patent
Belmonte Mula

(10) Patent No.: US 11,793,121 B2
(45) Date of Patent: Oct. 24, 2023

(54) INSTALLATION FOR A HANGING CULTIVATION SYSTEM

(71) Applicant: NEW GROWING SYSTEMS, S.L., Pulpi (ES)

(72) Inventor: Manuela Belmonte Mula, Pulpi (ES)

(73) Assignee: NEW GROWING SYSTEMS, S.L.

(*) Notice: Subject to any disclaimer, the term of this patent is extended or adjusted under 35 U.S.C. 154(b) by 140 days.

(21) Appl. No.: 16/761,268

(22) PCT Filed: Nov. 23, 2017

(86) PCT No.: PCT/ES2017/000147
§ 371 (c)(1),
(2) Date: May 4, 2020

(87) PCT Pub. No.: WO2019/102045
PCT Pub. Date: May 31, 2019

(65) Prior Publication Data
US 2020/0253131 A1   Aug. 13, 2020

(51) Int. Cl.
*A01G 9/02* (2018.01)
(52) U.S. Cl.
CPC .................... *A01G 9/024* (2013.01)
(58) Field of Classification Search
CPC ...... A01G 9/024; A01G 31/047; A01G 9/143; A01G 9/12; A01G 31/042; A01G 31/04; Y02A 40/25
See application file for complete search history.

(56) References Cited

U.S. PATENT DOCUMENTS

| 3,667,157 A | 6/1972 | Longhini ........................ 47/1.2 |
| 6,374,537 B1 | 4/2002 | Van Wingerden et al. ...... 47/17 |

FOREIGN PATENT DOCUMENTS

| DE | 202016102304 U1 | * | 9/2016 | ............... E06B 7/28 |
| ES | 2207409 A1 | * | 5/2004 | |
| GB | 419303 A | | 11/1934 | |
| JP | H 04365430 A | | 12/1992 | |
| JP | 2002034337 A | * | 2/2002 | |
| JP | 2005013047 A | | 1/2005 | |
| JP | 2006-254890 A | | 9/2006 | |
| JP | 2017-209099 A | | 11/2017 | |
| KR | 101456369 B1 | | 10/2014 | |
| KR | 20140117093 A | * | 10/2014 | ............. A01G 9/143 |
| KR | 20150015762 A | * | 2/2015 | |
| SU | 423430 A1 | | 4/1974 | |

(Continued)

OTHER PUBLICATIONS

Machine translation of ES-2207409-A1 (Year: 2021).*

(Continued)

*Primary Examiner* — Trinh T Nguyen
(74) *Attorney, Agent, or Firm* — OSTROLENK FABER LLP

(57) ABSTRACT

An installation that has a plurality of conduits hung by pairs of steel cables connected to rotary shafts such that the rotation of the same causes some conduits to ascend and others to descend, allowing the same to be situated at different heights. The rotary shafts from which the cables of the conduits hang are actuated by reducers actuated by a chain-and-sprocket drive that is actuated by a main shaft connected to a motor reducer.

8 Claims, 2 Drawing Sheets

(56) References Cited

FOREIGN PATENT DOCUMENTS

WO     WO 2014108607 A1     7/2014

OTHER PUBLICATIONS

Machine translation of JP-2002034337-A (Year: 2021).*
Machine translation of DE-202016102304-U1 (Year: 2021).*
Machine translation of JP-2002034337-A (Year: 2022).*
International Search Report dated Jun. 21, 2018 in corresponding PCT International Application No. PCT/ES2017/000147.
Written Opinion dated Jun. 21, 2018 in corresponding PCT International Application No. PCT/ES2017/000147.

* cited by examiner

INSTALLATION FOR A HANGING CULTIVATION SYSTEM

CROSS-REFERENCE TO RELATED APPLICATIONS

The present application is a 35 U.S.C. §§ 371 national phase conversion of PCT/ES2017/000147, filed Nov. 23, 2017, the contents of which are incorporated herein by reference. The PCT International Application was published in the English language.

OBJECT OF THE INVENTION

The present invention refers to an installation for hanging plant cultivation systems, which is designed for cultivating plants on the hanging conduits of a general structure.

The object of the invention is to provide an installation that makes it possible to efficiently cultivate plants, with the ability to raise and lower the plants as desired by the user in order to place them at the desired height, in accordance with the size of the plants, the humidity, temperature and suitable atmospheric conditions.

BACKGROUND OF THE INVENTION

Certain plant cultivations that remain hanged in the air in order to make it possible to grow and care for them require the plants to be raised as they grow so they do not drag on the ground, or alternatively so that they can be placed at a suitable height where the temperature, humidity and light conditions are optimal.

In any case, the installations known up to now have serious issues and drawbacks when it comes to raising the plants, which results in a costly task, not only from a financial point of view but also in regards to the operation itself, and more importantly, it does not meet the desired effectiveness.

The applicant is unaware of the existence of installations such as the one about to be described below.

DESCRIPTION OF THE INVENTION

The installation for the hanging cultivation system that is described has a series of characteristics that result in significant and remarkable advantages and improvements over conventional installations.

More specifically, the installation of the invention is comprised of a general supporting structure made of props, bars, trusses, beams, etc., with the particularity that they include a plurality of conduits where the plants grown are going to be located, with these conduits being hung from the ends thereof by respective pairs of steel cables, which are linked by the upper ends thereof to rotary shafts, so that fixing or arranging the ends of these suspension cables to the rotary shafts will make the pairs of conduits to go up and down simultaneously, which means that a pair of conduits, and therefore the plants associated with them, will go up following the direction in which the shafts rotate, and by contrast, another pair of conduits, and therefore the plants contained therein, will descend simultaneously, making it possible to cultivate plants at different growth rates and arrange them at a desired height depending on the size of the plants, the light conditions, temperature, humidity, etc., of the place where the installation is located.

The rotary shaft or shafts, on which the hanging cables of the conduits can be rolled up, are formed of sections joined together by means of connecting elements, with the particularity that these rotary shafts are actuated by means of a reducer, and they are connected to a main shaft actuated by a motor reducer using sprockets and chains, which are placed transversal to the rotary shafts, so that the motor reducer, which is considered the main driver, rotates the shafts connected to the suspension cables, making them roll/unroll in pairs in order to raise or lower the different conduits with the plants arranged on said conduits.

The rotary shafts will be attached to an upper horizontal beam of the general structure by means of bearings, tubular beams and fixing clamps.

In addition, the conduits have a collector for water collection on at least one of the ends thereof.

It should also be noted that the conduits have a truss structure that incorporates hooks on the unions thereof for the hanging cables of the conduits.

In this way, cultivation lines are established on the general supporting structure, making it possible to arrange pairs of conduits or alternatively groups of four pairs of conduits, forming alternate lines hung from the aforementioned rotary shafts.

DESCRIPTION OF THE DRAWINGS

To complete the invention described below and in order to give a better understanding of the characteristics of the invention, according to a preferred embodiment thereof, this description is accompanied by a set of drawings in which the figures described below have been represented, for purely illustrative purposes and should not be construed as limiting.

PREFERRED EMBODIMENT OF THE INVENTION

Figure 1:
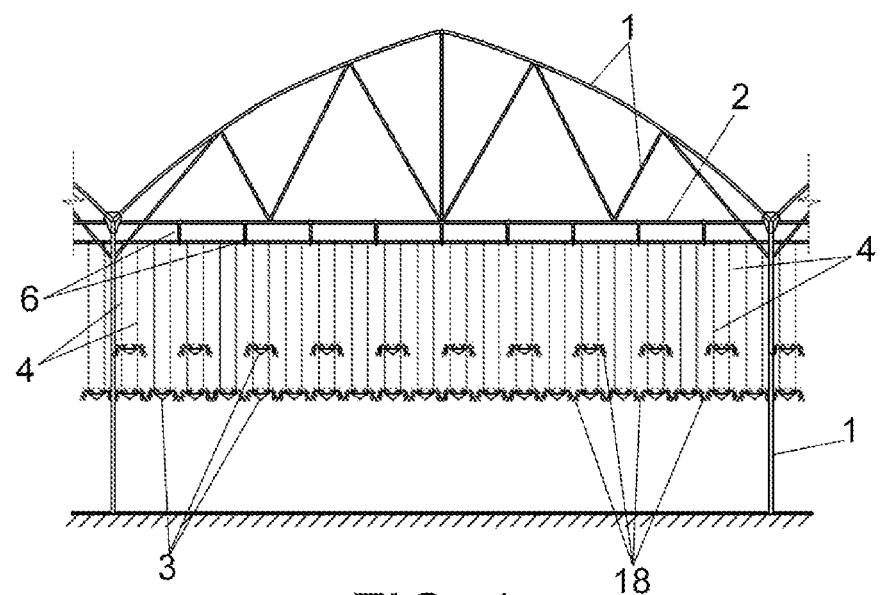
FIG. 1.—Shows a frontal elevation view of an installation for the hanging cultivation system designed according to the object of the invention, in which some conduits are aligned on a lower level and other conduits are aligned on a higher level than the aforementioned conduits.
Figure 2:
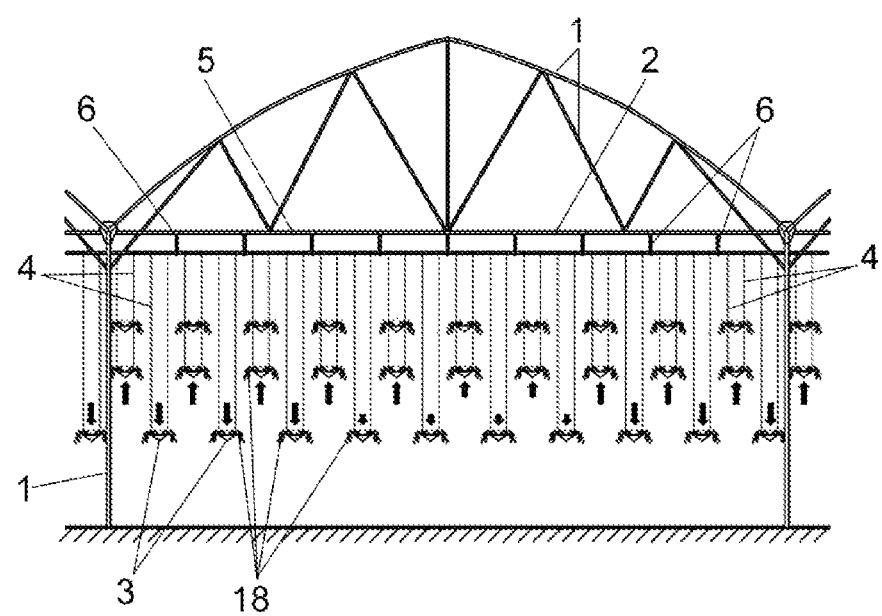
FIG. 2.—Shows a similar view as in the previous figure, but in this case there are conduits distributed on three levels at different heights.

In light of the drawings described above, it can be observed how the installation for cultivating plants that is the object of the invention is designed to form part of a general supporting structure (1) made of props, bars, trusses, beams and other conventional structural elements, as represented on FIG. 1.

This structure comprises at least one horizontal cultivation beam (2), the function of which will be explained later.

Figure 3:
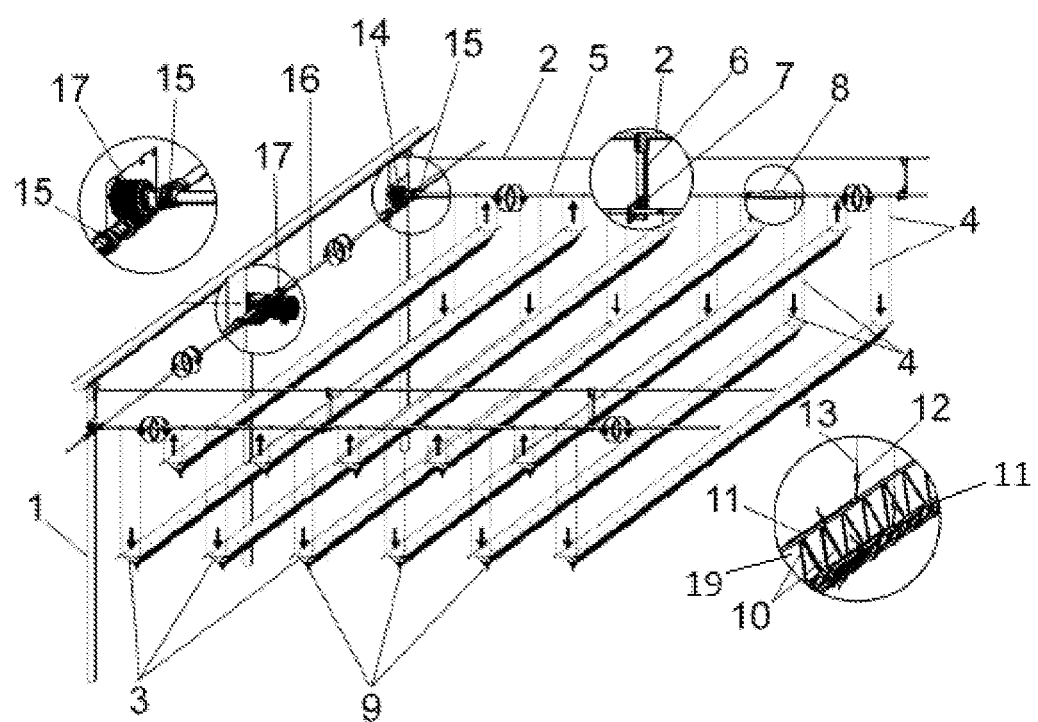
FIG. 3.—Shows a perspective view of the installation of the invention.

The installation of the invention is characterised in that it includes a plurality of conduits (3) where the plants (18) to be cultivated are going to be located, with these conduits being hung from the ends thereof by pairs of steel cables (4) connected to rotary shafts (5), which are supported by the cultivation beam (2) by means of a truss (6) and a bearing (7), as shown in the details of FIG. 3, while the rotary shafts (5) are formed by sections joined together by means of connecting elements (8), as shown also on FIG. 3.

Rotating and assembling the sections of the rotary shafts (5) is arranged in such a way that a series of hanging cables (4) are rolled in when rotating in one direction while others are rolled out in the same direction of rotation, causing some conduits (3) to be raised or lowered according to how the hanging cables (4) are arranged and attached.

These conduits (3) comprise a water collector (9) or funnel on one of the ends thereof, including bars (10) as a supporting structure for each case, with an enveloping plastic or other suitable wrapping material (19), beams (11), and hooks (12) corresponding to the connecting areas in order to hang the steel cables (13) in case the assembly is too long and needs to be held at intermediate points, which will also be linked to intermediate rotary shafts, which are not represented in the example embodiments chosen.

The rotation of the rotary shafts (5) is carried out by means of a reducer (14) using sprockets and chains (15) that are actuated by a main rotation shaft (16), which is actuated by a motor reducer (17) that causes the main shaft (16) to rotate and consequently, by means of said chain-and-sprocket drive (15), actuates the reducers (14) and therefore rotates the rotary shafts (5), which results in raising and/or lowering the conduits (3) and the plants (18) associated to them.

In this regard, both the motor reducer (17) as well as the reducers (14) are mounted on convenient plates fixed to the general supporting structure (1).

Finally, it should be highlighted that the actuation motor reducer (17) incorporates an end position in order to allow the shaft connected to it to rotate in both directions.

The invention claimed is:

1. An installation for hanging cultivation systems, comprising: a general supporting structure made of props, bars, trusses, struts, and a plurality of conduits, each conduit having ends, each end of each conduit being hung by a pair of cables for raising and lowering the conduit, each pair of cables being rollable and unrollabale on a respective rotary shaft connected to the general supporting structure and actuated by associated reducers connected to a main shaft of an actuation motor reducer, the main shaft of the actuation motor reducer being transverse to the rotary shafts hanging the conduits, each conduit comprising a wrapping material, two spaced longitudinally extending beams supporting the wrapping material, a truss structure that comprises a plurality of bars connected to the beams, and hooks located at connecting areas on the beams to hang additional steel cables to hold the conduit at intermediate points linked to intermediate rotary shafts.

2. The installation for hanging cultivation systems, according to claim 1, further comprising sprockets and chains for driving the rotation of the reducers to the rotary shafts.

3. The installation for hanging cultivation systems, according to claim 1, wherein the conduits are hung by pairs of steel cables connected to the rotary shafts, so that each conduit is linked to each pair of rotary shafts and rolls up in a direction different from the contiguous conduit, so that rotating said rotary shaft in one direction or the other will cause contiguous conduits to separate or approximate vertically.

4. The installation for hanging cultivation systems, according to claim 1, wherein the rotary shafts are formed by a successive series of sections of shafts joined together by means of connecting elements.

5. The installation for hanging cultivation systems, according to claim 1, wherein the rotary shafts are hung by means of bearings and tubular trusses of cultivation beams arranged as horizontal beams of the general supporting structure.

6. The installation for hanging cultivation systems, according to claim 1, wherein each conduit comprises a water collector on at least one of the ends thereof.

7. The installation for hanging cultivation systems, according to claim 1, wherein the actuation motor reducer and the reducers are mounted on plates fixed to the general supporting structure.

8. The installation for hanging cultivation systems, according to claim 1, wherein the actuation motor reducer incorporates an end position in order to allow the shaft connected to it to rotate in both directions.

* * * * *